United States Patent [19]

Tseng

[11] Patent Number: 5,485,148
[45] Date of Patent: Jan. 16, 1996

[54] PIPELINE FLUID TRAVEL MONITORING SYSTEM

[76] Inventor: Ling-yuan Tseng, 13772 Calle Tacuba, Saratoga, Calif. 95070

[21] Appl. No.: 40,887

[22] Filed: Mar. 31, 1993

[51] Int. Cl.$^6$ .................................................. H04Q 7/00
[52] U.S. Cl. .................................................. 340/825.54
[58] Field of Search .................... 340/825.49, 825.54; 324/67, 326; 15/104.063; 137/551; 73/865.8, 866.5; 74/5 R

[56] References Cited

U.S. PATENT DOCUMENTS

| | | | |
|---|---|---|---|
| 2,820,959 | 1/1958 | Bell | 324/67 |
| 4,218,923 | 8/1980 | Triplett et al. | 73/623 |
| 4,714,888 | 12/1987 | French et al. | 324/326 |
| 4,747,317 | 5/1988 | Lara | 73/865.8 |
| 5,008,661 | 4/1991 | Raj | 340/825.54 |
| 5,056,049 | 10/1991 | O'Neill | 364/562 |
| 5,139,576 | 8/1992 | Davis | 134/8 |
| 5,195,392 | 3/1993 | Moore et al. | 73/866.5 |

*Primary Examiner*—Michael Horabik
*Attorney, Agent, or Firm*—Gifford, Krass, Groh, Sprinkle, Patmore, Anderson & Citkowski

[57] ABSTRACT

In a pipeline fluid tagging system, an RF transmitter enclosed within a sealed housing is immersed in one or more of the fluids being transported, and transmits information pertaining to that fluid, such as its type, destination and quantity. One or more receivers, preferably located around the joints between lengths of the pipeline receives the RF signals and communicates them to a data collection facility either by a separate RF transmitter or along land lines. To avoid damage and wear, the transmitter housing is formed into a shape that minimizes contact with the inner wall of the pipeline. This shape is used in conjunction with passive and active mechanical stabilization techniques to further ensure that the transmitter maintains its orientation along the longitudinal center line of the pipe.

14 Claims, 3 Drawing Sheets

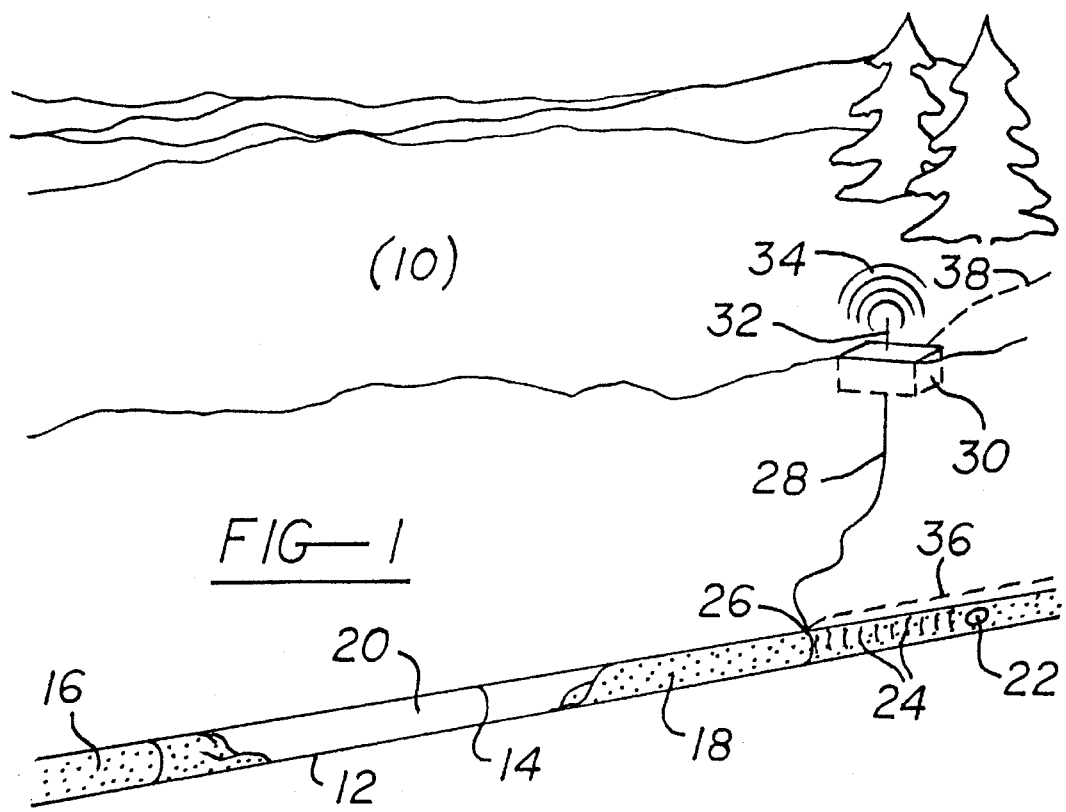
FIG—1
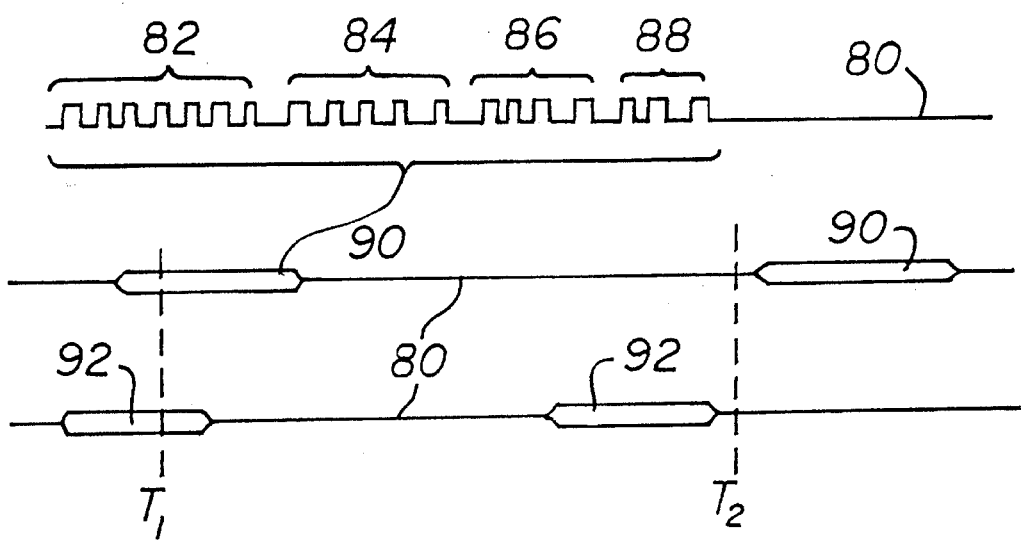
FIG—3

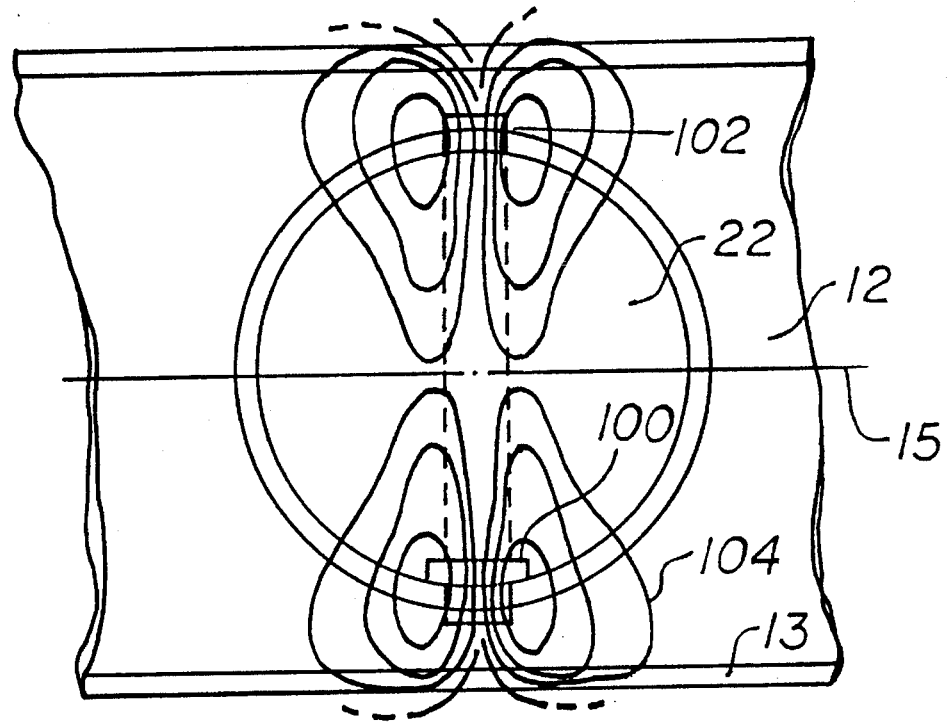
FIG—4
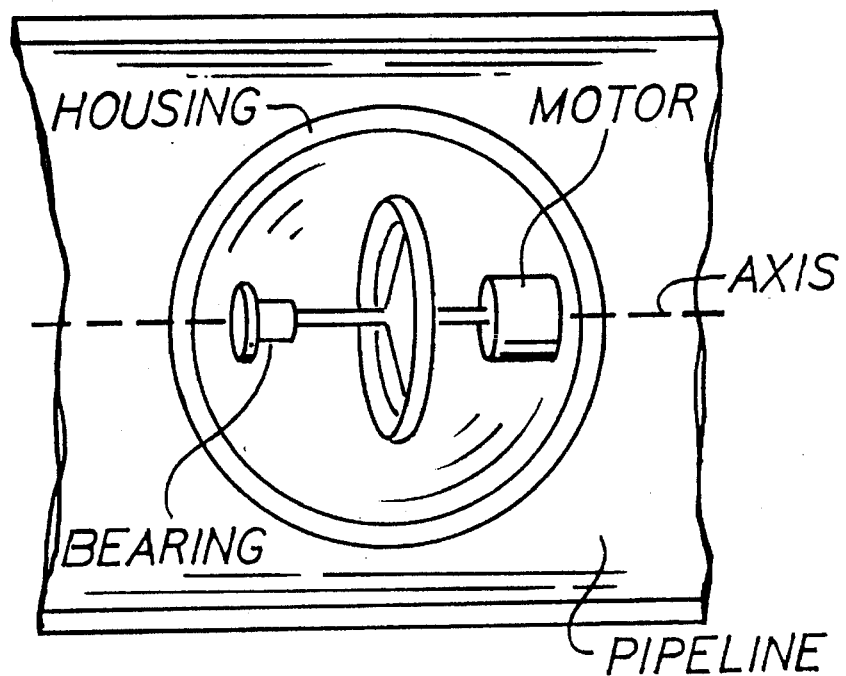
FIG—5

PIPELINE FLUID TRAVEL MONITORING SYSTEM

FIELD OF THE INVENTION

The present invention relates to apparatus and methods for the identification of fluids traveling in a pipeline and, in particular, to a system wherein a sealed transmitter travels with the fluid and radiates identification information to one or more receivers placed along the pipeline.

BACKGROUND OF THE INVENTION

Pipelines have become an indispensable means of transporting industrial fluids such as petroleum-related products. There are now many thousands of miles of pipelines throughout the world, particularly in North America and the Middle East, where oil reserves are plentiful.

These pipelines have become extremely sophisticated and are now capable of carrying multiple fluids along the same line, the fluids having various compositions, depending upon source grade, level of refinement, destination and the like. As such, the pipeline configurations now include complex switching to route the various fluids in accordance with their intended application.

That these fluids are securely contained within a long-distance conduit facilitates efficient delivery, but also complicates identification during transport. Given a substantially consistent flow rate and no maintenance requirements, fluid switching and collection might be straightforward; in practice, however, inconsistencies in flow, maintenance issues, and even operator error make fluid identification and error-free distribution increasingly difficult, if not impossible, in some cases.

Of the techniques available to ensure proper fluid identification and distribution, most are highly unsatisfactory. Statistical methods, for example, are only exacting if flow rates, maintenance levels and operator error are contained within predictable boundaries. Manual techniques, which involve sampling the fluid and testing it for composition, are time consuming and contribute to the very inconsistencies that make other techniques such as statistical methods prone to inaccuracy.

Clearly there exists a need for a system to ensure efficient, highly predictable identification and distribution of these valuable fluid commodities while, at the same time, eliminating waste and potential errors.

SUMMARY OF THE INVENTION

The present invention dramatically minimizes fluid identification problems by providing a transmitter disposed in a housing adapted to travel along with the fluid in the pipeline and transmit signals representative of information relating to the fluid, such as the type of fluid, the quantity of fluid and its destination. At least one receiver is placed along the length of pipeline and the receiver interfaces to signal processing and communication circuitry operative to inform personnel monitoring the distribution of such fluids as to their status.

In the preferred embodiment, the transmitter housing adapted to travel with the fluid is formed into a shape which promotes travel along the longitudinal center line of the pipe, so as to minimize contact between the housing and the pipeline. The preferred shape is spherical, although alternative shapes include a cone with the point oriented upstream, and a hollow funnel having a large inlet oriented upstream and a relatively smaller outlet oriented downstream. Additionally, the transmitter housing preferably includes stabilization means to keep the housing oriented toward the center of the pipeline. In the preferred embodiment, the housing includes a ballast operative to counteract buoyancy and the tendency of the housing to rotate about its center of mass. Further embodiments include the use of a strong magnetic field which interacts with the composition of the pipeline walls to keep the housing oriented along the center line and/or a gyroscope operative to maintain the movement of the housing along its preferred orientation.

BRIEF DESCRIPTION OF THE DRAWINGS

FIG. 1 is a picture of an environment in which the present invention might be installed and used;

FIG. 3 shows typical transmitter waveforms;

FIG. 4 is a cut-away view of a transmitter embodied in a spherical housing showing how an annular magnet may be used to maintain its position about the center line of a pipeline; and FIG. 5 is a drawing illustrating the use of a gyroscope according to the invention to stabilize housing position within a pipeline.

DETAILED DESCRIPTION OF THE PREFERRED EMBODIMENTS

Figure 2:
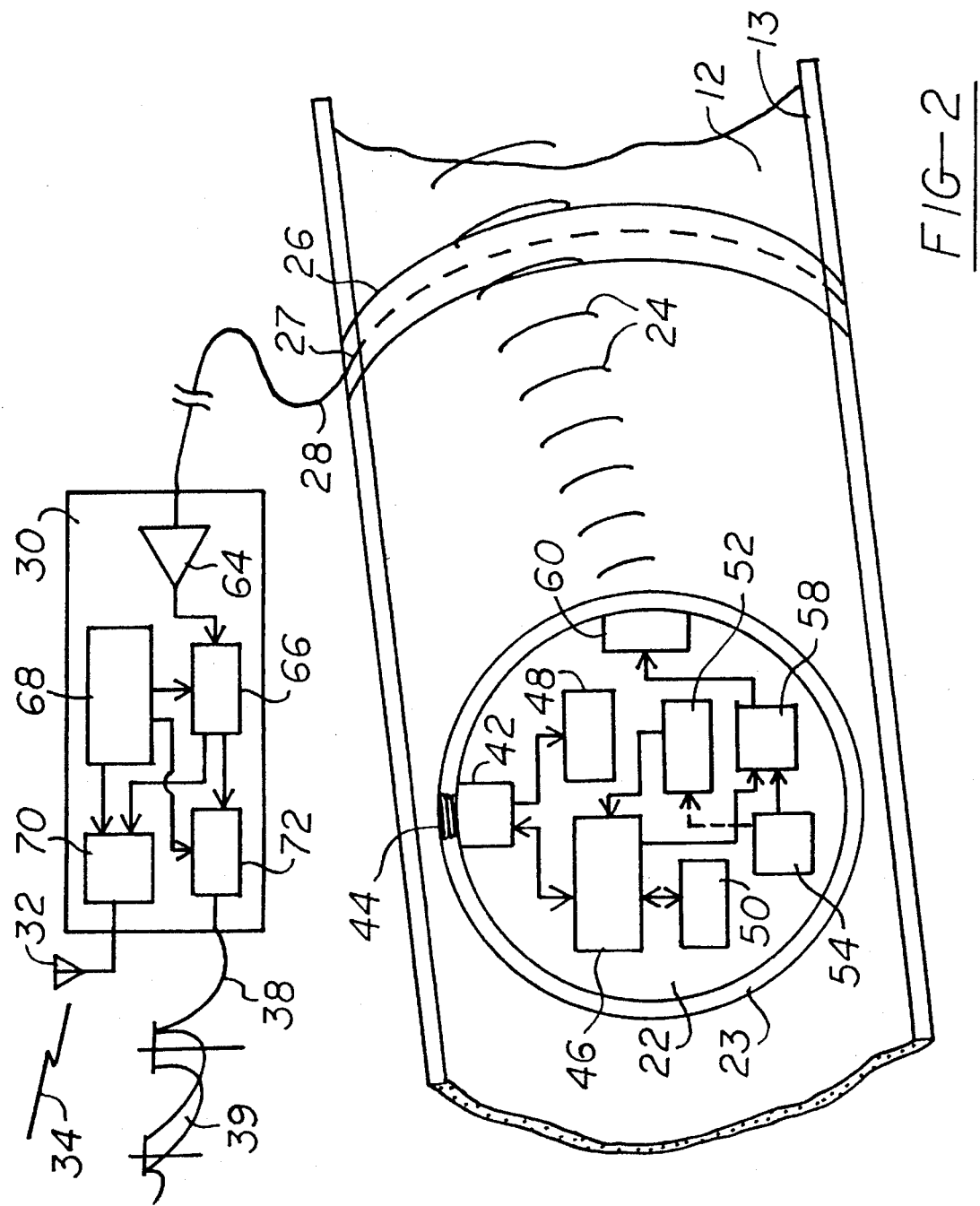
FIG. 2 depicts block diagrams of the transmitter and receiver subsystems.

Referring to FIG. 1, illustrated therein is a typical environment 10 within which the present invention is installed and operating. The drawing shows an underground pipeline 12 in a rural setting, though urban installations and above-ground pipelines are equally eligible to benefit by the present invention. The pipeline is typically installed in sections connected at joints such as joint 14.

Flowing in pipeline 12 is a first fluid 16 and a second fluid 18 separated by a buffer area 20 within the pipeline. Note that this drawing is not to scale, and obviously the buffer would be much longer to ensure that the two fluids do not mix during transport. As an example, fluid 1 might be gasoline at an octane of, say, 95, whereas the second fluid might be diesel fuel. The present invention is not limited to the transport of petroleum products, however, as water and various chemicals in liquid form are also applicable. Depending upon the fluid being transported, the buffer may contain a gas or liquid; typically, air or water is used for this purpose.

The present invention includes a transmitter in a sealed housing 22 which communicates preferably via RF signals 24 to a pickup antenna 26 located at some point along the length of pipeline 12. FIG. 1 shows the transmitter being carried within the second fluid 18, though it is anticipated that many or all of the disparate fluids being transported would carry their own sealed transmitter housing. By adjusting the weight of housing, the transmitter will be immersed in the center of the pipe line for fluids of varying density and viscosity. Additionally, while only one receiver is depicted in FIG. 1, preferably the present invention includes multiple receivers stationed regularly or irregularly along the pipeline. All the receivers could be routed to a central location for a centralized control.

Pickup antenna 26 communicates along electrical line 28 to a receiver subsection 30 where signals gathered from transmitter 22 are collected and retransmitted to operating personnel, either through antenna 32 via RF wave 34, or through a ground line 38. It is also possible to locate the receiver at a remote location, such as through the use of network communication cables 36 buried along side the pipe during most or all of its length.

FIG. 2 shows transmitter and receiver electronics. Transmitter 22, contained within spherical housing 23 is again immersed in a fluid flowing through pipeline 12 having a wall 13. In the preferred embodiment, transmitter 22 includes an input/output interface 42 hermetically sealed within housing 23, but accessible through a plug 44. This I/O connector is used to communicate with both a control unit 46, preferably a programmed microprocessor and a battery 48, preferably being rechargeable. The battery is used to power all components in the transmitter housing, though connections to those components are not shown. Control unit 46 interfaces to several other components within the transmitter housing, including a timer 52 and a memory unit 50. The memory is used to store data relating to the identification of the fluid within which it has been immersed, such as the type of fluid, the quantity in that batch, and the destination of the fluid. Preferably, this memory would be of the non-volatile semiconductor type, such as an electrically reprogrammable read-only memory (EEPROM) or, alternatively, may be a random-access memory with its contents kept active through battery 48. Memory 50 would be loaded under the direction of control unit 46 through I/O port 42 before immersing transmitter 22 in the fluid. In the preferred embodiment, a workstation containing information about various fluids, their quantities and destinations, would be interfaced to I/O port 42 by removing plug 44 to facilitate a cable connection. After loading and verifying the stored fluid-identification data, the housing would again be sealed.

Once immersed in the fluid, control unit 46 routes the identification information from memory 50 to a modulator 58 which feeds a transmitter 60, producing RF wave 24. In the preferred embodiment, an RF oscillator, 54, is used to set and maintain a particular RF frequency for each transmitter unit. In an alternative configuration, instead of modulating the fluid identification information onto the RF carrier, modulator 58 may be replaced by a simpler RF switch, with the identification information being transmitted as a CW wave by chopping the output of oscillator 54.

Since transmissions do not need to be continuous, a timer 52 is used in the preferred embodiment to time transmissions, thus conserving battery power. Timer 52 may be driven by its own oscillator or, alternatively, by dividing the frequency from oscillator 54.

Preferably at the joint 26 between two lengths of pipeline, there is placed one or more receiving antennas 27 in the form of a wire loop embedded within the junction of two lengths of pipe. The RF signal 24 sent by transmitter 60 is picked up by this loop and delivered along line 28 to a receiver 30 located in various places relative to the pipe, as previously described.

Within receiver 30, the signal along line 28 is amplified by RF amplifier 64, and decoded or demodulated by decoder block 66, depending upon whether a modulated or cap CW wave is used for transmission. Receiver 30 contains its own control unit 68, also preferably a programmed microprocessor, which directs the output of the decoded fluid identification information to another RF transmitter 70 which communicates to a remote data collection center by transmitting a signal 34 over antenna 32. Receiver 30 also contains an I/O unit 72 connected to decoder 66 and directed by control unit 68, which can send the fluid ID data via above-ground common-carrier 39 or via buried cable (not shown), to accommodate a hard-wired data-accumulation networking scheme.

FIG. 3 provides transmitter waveforms and illustrates how data might be encoded and how signals from multiple transmitters are rendered unambiguous. Fluid identification data is preferably contained within packets 90 separated by inactive periods 80. The upper waveform in FIG. 3 shows the packet as a pulse-width modulated signal, though, as mentioned, other forms of modulation including CW transmitting are equally applicable. Preferably, each packet 90 would be commenced with a "preamble" signal waveform 82, alerting the receiver 30 that a transmission is about to begin. With the receiver ready to decode the packet, fluid identification information would then be transmitted, such as various bits 84 indicating fluid type, other bits 86 indicating quantity and destination as shown by pulses 88. The invention is not limited to these pieces of information, however, as additional status information may be included before the packet terminates and goes idle as indicated by line 80.

Since it is possible for a single receiver to detect transmissions from multiple transmitter housings, the present invention anticipates various techniques to avoid interference. In the preferred embodiment, packet periodicity would be varied among transmitter, as shown in the lower two waveforms of FIG. 3. With the packets 90 of waveform A having a greater separation than the packets 92 of waveform B, even though the two packets may interfere at a time T1, the receiver may simply be programmed to wait until a time, usually the next detection cycle, when the packets will no longer interfere, as shown at time T2. In an alternative embodiment, each housed transmitter can use a slightly RF frequency, or a small set of frequencies, ensuring that transmitters with the same frequency are not carried by immediately consecutive fluids.

Several techniques are employed to ensure that the transmitter housing does not touch or scrap against the inner wall of the pipeline. FIG. 4 shows the preferred use of a strong magnet and a spherical housing, though the preferred magnetic stabilization may be used with any of the housings to be described shortly. In FIG. 4, the transmitter 22 is immersed in a fluid flowing through pipeline 12 having wall 13 and a center line 15. The magnet 102 is formed as a ring around the housing, the cylindrical center line of the ring being in substantial conformance with the longitudinal center line 15 of the pipeline. This magnet, preferably of a strong rare-earth magnetic material, is used in conjunction with a ballast weight 100. This weight is adjustable and set by operating personnel in accordance with the particular fluid within which the transmitter will be immersed, to match its density and thus balance the transmitter for buoyancy within that fluid. Once density-matched to its fluid, the strong magnetic field 104 produced by magnet 102 interacts with the composition of the pipeline wall 13, and causes the transmitter housing to remain substantially oriented about the longitudinal center line 15 of pipeline 12.

In addition to the passive stabilization techniques shown, those techniques involving ballast weighting, the use of a magnetic ring, and housing shapes conductive to longitudinal stability within the fluid, the present invention may also alternatively incorporate the use of active stabilization techniques such as the use of a gyroscope. As depicted in FIG. 5, the gyroscope would be positioned with its axis along the longitudinal center line of the housing, thus counteracting forces attempting to move the housing off of its preferred orientation, such as might occur as the pipeline bends or turns.

Having thus described my invention, I claim:

1. A pipeline fluid tagging system, comprising:

a housing adapted to travel with a fluid in a pipeline;

a transmitter disposed in said housing operative to transmit signals representative of information relating to the identification of said fluid;

at least one stationary receiver disposed externally to said pipeline to receive the signals transmitted by said transmitter; and signal processing and communication circuitry connected to said receiver operative to output said identification information to a user of said system for the purpose of monitoring said fluid as it travels through said pipeline.

2. The pipeline fluid tagging system of claim 1 wherein said information relating to the identification of said fluid includes fluid type.

3. The pipeline fluid tagging system of claim 1 wherein said information relating to the identification of said fluid includes the quantity of the fluid.

4. The pipeline fluid tagging system of claim 1 wherein said information relating to the identification of said fluid includes the destination of the fluid.

5. The pipeline fluid tagging system of claim 1 wherein said transmitter communicates to said receiver via RF signals.

6. The pipeline fluid tagging system of claim 1 wherein said pipeline is assembled from discrete lengths of pipe, and wherein said receiver includes an antenna positioned proximate to the joint between two of said lengths of pipeline.

7. The pipeline fluid tagging system of claim 1, further including means to minimize contact between said housing and the internal sidewall of said pipeline.

8. The pipeline fluid tagging system of claim 7, said means to minimize contact between said housing and said pipeline sidewall including stabilization means disposed in said housing operative to promote travel along the longitudinal centerline of said pipeline.

9. The pipeline fluid tagging system of claim 8 wherein said stabilization means includes a ballast operative to balance the buoyancy of said transmitter housing.

10. The pipeline fluid tagging system of claim 8, said stabilization means including a magnetic component operative to interact with the material composition of said pipeline and balance forces tending to pull said housing toward said pipeline sidewall.

11. The pipeline fluid tagging system of claim 8 wherein said stabilization means includes a gyroscope.

12. The pipeline fluid tagging system of claim 7, said means to minimize contact between said housing and said pipeline sidewall including a housing shape to minimize said contact.

13. The pipeline fluid tagging system of claim 12 wherein the shape of said housing is substantially spherical.

14. A pipeline fluid tagging system, comprising:

a housing adapted to travel with a fluid in a pipeline, said housing being shaped to promote travel along the longitudinal centerline of the pipeline;

stabilization means disposed within said housing operative to orient said housing within said fluid to minimize contact between said housing and the inner wall of the pipeline;

an RF transmitter disposed in said housing operative to transmit signals representative of information relating to the identification of said fluid, including fluid type, quantity and destination;

at least one RF receiver positioned along the length of said pipeline, said receiver being adapted to receive the signals transmitted by said transmitter; and signal processing and communication circuitry connected to said receiver operative to output said identification information to a user.

\* \* \* \* \*